United States Patent
Boiger

(10) Patent No.: US 6,688,963 B2
(45) Date of Patent: Feb. 10, 2004

(54) DEVICE FOR VENTILATION OF A MOTOR VEHICLE

(75) Inventor: Peter Boiger, Wernau (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/168,600

(22) PCT Filed: Dec. 6, 2000

(86) PCT No.: PCT/DE00/04339

§ 371 (c)(1), (2), (4) Date: Oct. 29, 2002

(87) PCT Pub. No.: WO01/47731

PCT Pub. Date: Jul. 5, 2001

(65) Prior Publication Data

US 2003/0109213 A1 Jun. 12, 2003

(30) Foreign Application Priority Data

Dec. 24, 1999 (DE) .......................... 199 62 966

(51) Int. Cl.[7] ............................................. B61D 27/00
(52) U.S. Cl. ..................... 454/75; 454/128; 454/129
(58) Field of Search .......................... 454/75, 128, 129, 454/143

(56) References Cited

U.S. PATENT DOCUMENTS

| | | | | |
|---|---|---|---|---|
| 4,518,032 A | * | 5/1985 | Funasaki et al. | 165/202 |
| 4,658,925 A | * | 4/1987 | Hirosawa et al. | 180/68.1 |
| 5,259,814 A | * | 11/1993 | Weissbrich et al. | 454/75 |
| 5,333,703 A | * | 8/1994 | James et al. | 180/271 |
| 5,509,852 A | * | 4/1996 | Clark | 454/75 |
| 5,775,406 A | * | 7/1998 | Ghitea, Jr. | 165/11.1 |
| 6,175,782 B1 | * | 1/2001 | Obradovich et al. | 701/1 |

FOREIGN PATENT DOCUMENTS

| | | |
|---|---|---|
| DE | 29 41 305 | 4/1980 |
| DE | 30 15 072 | 10/1980 |
| DE | 33 24 107 | 3/1984 |
| DE | 34 31 372 | 3/1986 |
| FR | 2 172 513 | 9/1973 |

* cited by examiner

Primary Examiner—Derek Boles
(74) Attorney, Agent, or Firm—Kenyon & Kenyon

(57) ABSTRACT

A device for ventilating a motor vehicle is proposed, in which an air-quality signal (11) indicating reduced air quality, and an opening signal (22) indicating an opened state of a component actuated by an actuating drive (19, 20), or an opening request, are transmitted to an AND operation (15) whose output signal (24) is transmitted to a warning device (25, 26).

8 Claims, 1 Drawing Sheet

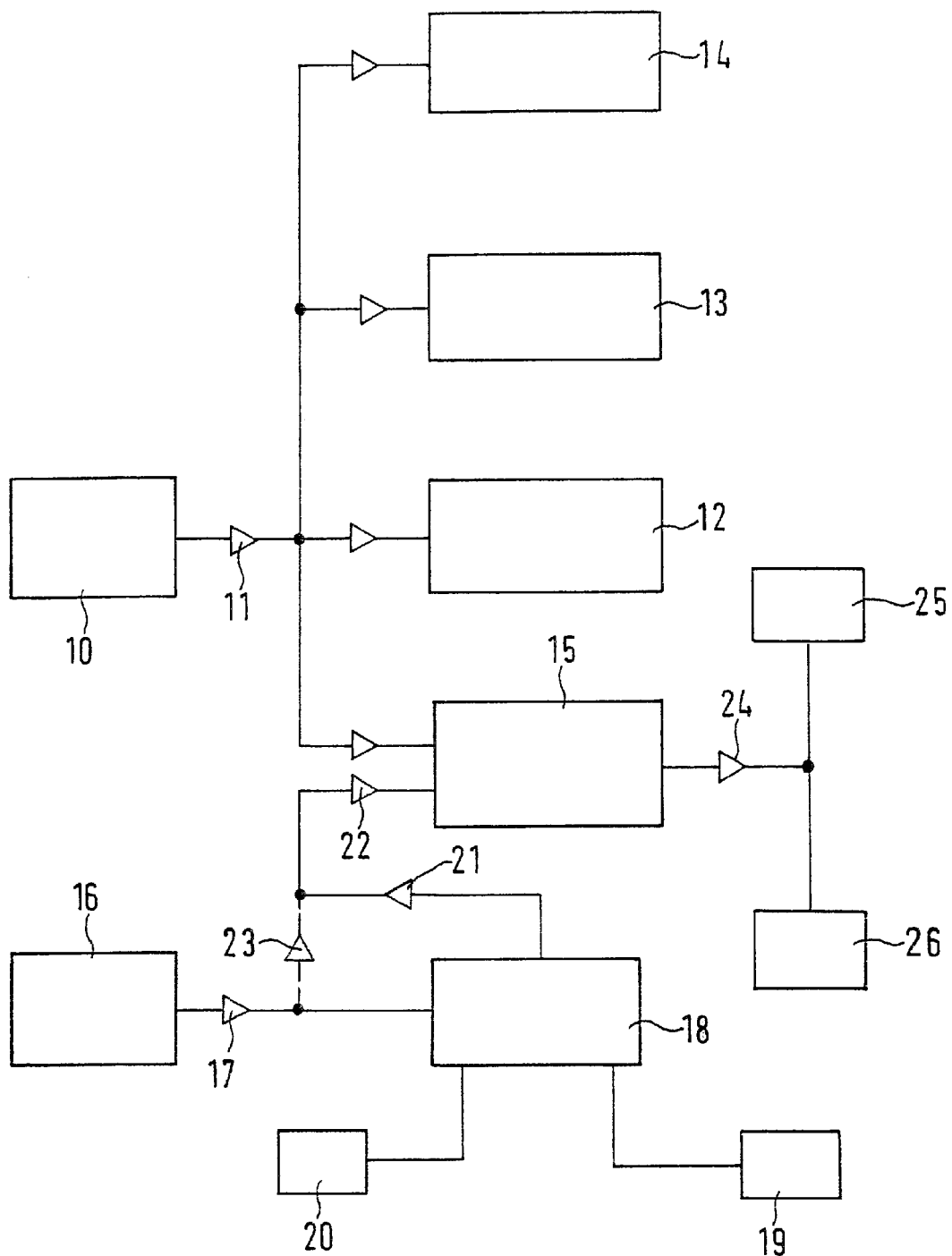

DEVICE FOR VENTILATION OF A MOTOR VEHICLE

FIELD OF THE INVENTION

The present invention relates to a device for ventilating a motor vehicle.

BACKGROUND INFORMATION

German Published Patent Application No. 29 41 305 discusses a device for ventilating a motor vehicle that has an air-quality sensor for monitoring the air quality in the interior and exterior region of the motor vehicle. The signal emitted by the air-quality sensor is compared to specified threshold values of the air components to be detected. If a threshold value is exceeded, measures such as the initiation of a recirculation operation instead of a fresh-air operation may be taken.

German Published Patent Application No. 33 24 107 discusses an actuating drive located in a motor vehicle, in which the position of a sunroof may be preselected by a setpoint generator.

SUMMARY OF THE INVENTION

The present invention may provide a device for ventilating a motor vehicle, which may avoid a deterioration in the air quality inside a motor vehicle to a great extent.

A device according to the present invention may avoid an inappropriate operating state of the device for ventilating the motor vehicle. Such a state may occur, for example, when the air-quality sensor detects poor air quality, and countermeasures, such as switching from fresh-air to recirculation mode, are taken as a result, yet a window or a sunroof, for instance, is open or is to be opened simultaneously. According to an example embodiment of the present invention, an air-quality signal supplied by the air-quality sensor, and an opening signal supplied by an actuating drive, may be forwarded to an AND operation. If both signals are present simultaneously, a warning device may be actuated. After such a warning, the driver may initiate appropriate countermeasures, by implementing a closing operation of the actuating drive, for instance.

An example embodiment may provide for a warning device to include a warning light, that may be located within the driver's field of vision. According to another example embodiment, the warning device may provide an acoustic signal that alerts the driver to a undesirable operating state.

A further example embodiment of the present invention may provide that the opening signal be derived from a position signal of the component to be adjusted by the actuating device. Another example embodiment may provide that the opening signal be derived from an operating signal of the actuating device, which is generated by an operating device.

BRIEF DESCRIPTION OF THE DRAWING

The FIGURE shows a block diagram of a device for ventilating a motor vehicle according to an example embodiment of the present invention.

DETAILED DESCRIPTION

An air-quality sensor 10 provides an air-quality signal 11, which signals that a specified threshold has been exceeded by at least one of the air components to be detected. Air-quality signal 11 is supplied to a recirculation vent 12, a fresh-air tank 13, a catalyzer 14 and an AND operation 15.

An operating device 16 supplies an operating signal 17 to an actuating-drive control 18. Actuating-drive control 18 controls a sunroof 19 and a window lifter 20. Sunroof control 18 transmits a first signal 21 as opening signal 22 to AND operation 15. Instead of first signal 21, second signal 23, drawn in by the dotted line, is provided as opening signal 22, which is directly derived from operating signal 17. An output signal 24 of AND operation 15 actuates an acoustic warning device 25 and/or an optical warning device 26.

A device for ventilating a motor vehicle according to an example embodiment of the present invention may function as follows:

Air-quality sensor 10 detects at least one harmful air component in the exterior and/or the interior region of the motor vehicle. A sensor element of the air-quality sensor 10 may be disposed in an intake duct for the fresh air, to thus detect the air quality of the air in the exterior region. The air-quality sensor generates air-quality signal 11, which is to be a switching signal. Not described further are the signal-sensing system present in air-quality sensor 10, the signal processing as well as the signal evaluation. Air-quality signal 11 may indicate that at least one detected air component has exceeded a threshold.

For example, air-quality signal 11 may initiate an actuation of recirculation vent 12, which is to be moved from fresh-air position to recirculation position, or vice versa.

Furthermore, air-quality signal 11 may initiate the admixture of fresh air into the interior of the motor vehicle, which may be held in readiness in fresh-air tank 13. Moreover, within the framework of the recirculation operation, air-quality signal 11 may activate catalyzer 14, which may implement a purification of the recirculated interior air.

Air-quality signal 11 is supplied to AND operation 15, which is also provided with opening signal 22.

Opening signal 22 originates from at least one actuating drive of a movable component of the body shell, which is located in the motor vehicle. In the depicted example embodiment, a sunroof 19 and a window lifter 20 are provided. Actuating drives 19, 20 are actuated by actuation-drive control 18 as a function of operating signal 17, which is generated by operating device 16. Operating device 16 may include simple toggle switches, for instance, by which an opening or closing operation may be initiated. Operating device 16 may also have a position-preselection device, so that operating signal 17 represents a setpoint-position signal instead of a simple switching signal.

Opening signal 22 is provided by actuating-drive control 18, for instance, which generates opening signal 22 as first signal 21. First signal 21 may be provided in the case of actuating drives 19, 20, where the position of the component to be moved is known in actuating-drive control 18. The actual-position signal within actuating-drive control 18 may be directly utilized to provide first signal 21. First signal 21 is generated whenever the actual position does not correspond to the closed state of the component to be moved by actuating drive 19, 20.

Alternatively, opening signal 22 may be derived from operating signal 17, which in this case becomes second signal 23. Second signal 23 may be provided in the case of actuating drives 19, 20 which may not include a position check-back signal, or in which actuating-drive control 18 does not contain the actual position in an otherwise retrievable fashion. In these cases, second signal 23 is to be provided whenever operating device 16 sends out an opening request.

However, second signal 23 may also be provided in the case of actuating drives 19, 20, where operating signal 17 corresponds to a specified setpoint position of the component actuated by actuating drives 19, 20. In this case, the second signal is to be provided whenever operating signal 17 corresponds to a position not corresponding to the closed state of the actuated component.

AND operation 15 provides output signal 24 in those cases where both air-quality signal 11 and also opening signal 22 satisfy the AND conditions, i.e., are present simultaneously. Output signal 24, therefore, signals an operating state of the ventilation device in which poor air quality is detected, on the one hand, and in which an opened body component, for instance an opened sunroof 19 and/or an opened window 20, is present, on the other hand. Output signal 24 also may occur when, on the one hand, air-quality signal 11 is present and an operator specifies an opening request via operating device 16.

Output signal 24 may be transmitted to optical warning device 26, which is located, for instance, as an illuminated display in the dashboard of the motor vehicle within the driver's field of vision. In addition, or as an alternative, acoustical warning device 25 may be provided. An active warning device 25, 26 notifies the driver, or the operator of the motor vehicle of an operating state of the ventilation device, which may not be expedient in all situations, due to the drop in air quality. On the basis of the warning, the individual driver or operator may decide whether to initiate a closing operation via operating device 16 of actuating device 19, 20. Instead of the manual intervention in actuating drives 19, 20, an independent intervention may be provided to the extent that this is permissible and/or desirable.

What is claimed is:

1. A device for ventilating a motor vehicle including an actuating drive configured to provide an opening signal, comprising:
   an air-quality sensor configured to provide an air-quality signal indicating a reduced air quality;
   a warning device; and
   an AND device configured to receive the air-quality signal and the opening signal and to produce an output signal to activate the warning device.

2. The device according to claim 1, wherein the actuating drive includes at least one of a sunroof and a window lifter.

3. The device according to claim 1, wherein the warning device includes an optical warning device.

4. The device according to claim 1, wherein the optical warning device includes an illuminated display in a field of vision of a driver of the motor vehicle.

5. The device according to claim 1, wherein the warning device includes an acoustic warning device.

6. The device according to claim 1, further comprising an arrangement configured to derive the opening signal from an operating signal indicating a setpoint position of a component actuated by the actuating drive that does not correspond to a closed position.

7. The device according to claim 1, further comprising an arrangement configured to derive the opening signal from an operating signal configured to initiate an opening operation of a component actuated by the actuating drive.

8. The device according to claim 1, further comprising an arrangement configured to retrieve an actual position of a component actuated by the actuating drive that is not in a closed position, the opening signal corresponding to the actual position.

* * * * *

UNITED STATES PATENT AND TRADEMARK OFFICE
CERTIFICATE OF CORRECTION

PATENT NO. : 6,688,963 B2
DATED : February 10, 2004
INVENTOR(S) : Peter Boiger

It is certified that error appears in the above-identified patent and that said Letters Patent is hereby corrected as shown below:

Title page,
Item [57], ABSTRACT, delete "A device.........(25, 26)." and insert -- A device for ventilating a motor vehicle is described, in which an air-quality signal indicating reduced air quality, and an opening signal indicating an opened state of a component actuated by an actuating drive, or an opening request, are transmitted to an AND operation whose output signal is transmitted to a warning device --.

Signed and Sealed this

Twelfth Day of April, 2005

JON W. DUDAS
*Director of the United States Patent and Trademark Office*